United States Patent [19]

Torrington

[11] 4,272,083

[45] Jun. 9, 1981

[54] VIDEO DISC PLAYER HAVING RECORD EXTRACTING MECHANISM

[75] Inventor: Leslie A. Torrington, Indianapolis, Ind.

[73] Assignee: RCA Corporation, New York, N.Y.

[21] Appl. No.: 80,601

[22] Filed: Oct. 1, 1979

[30] Foreign Application Priority Data

Apr. 6, 1979 [GB] United Kingdom—79/12291

[51] Int. Cl.³ .................... G11B 25/04; G11B 17/04
[52] U.S. Cl. ................................. 369/77; 358/128.5; 369/262; 369/291; 369/126
[58] Field of Search .................. 274/9 B; 358/128; 360/133, 97

[56] References Cited

U.S. PATENT DOCUMENTS

| | | | |
|---|---|---|---|
| 4,098,511 | 7/1978 | Leedom | 274/9 B |
| 4,124,866 | 11/1978 | Coleman | 274/9 B X |
| 4,133,540 | 1/1979 | Torrington | 274/9 B |
| 4,164,782 | 8/1979 | Stewart | 360/133 |

Primary Examiner—Harry N. Haroian
Attorney, Agent, or Firm—E. M. Whitacre; J. S. Tripoli; D. A. Kulkarni

[57] ABSTRACT

A record caddy, suitable for use with a video disc player, includes a sleeve and a record retaining spine removably located therein. Disposed on the spine are latch members for releasably locking the spine to the sleeve. Latch defeat fingers, disposed in the player, are wedged between the respective spine latch fingers and interior portions of the sleeve during an occupied caddy arrival at a fully inserted position in the player, so that the spine latch fingers are deflected in a manner freeing the spine from the sleeve. The player is further equipped with spine gripper members for locking the spine to the player during such caddy arrival, whereby subsequent sleeve withdrawal removes the spine and the accompanying record from the sleeve for retention in player. To retrieve the retained record, an empty sleeve is inserted into the player. Insertion of the sleeve into the player for record retrieval causes deflection of the latch defeat fingers, which deflection, in turn, results in displacement of the spine gripper members in a manner disengaging the spine from the player, whereby the spine and the associated record are removed from the player during subsequent caddy withdrawal.

7 Claims, 4 Drawing Figures

VIDEO DISC PLAYER HAVING RECORD EXTRACTING MECHANISM

This invention generally relates to a caddy-type video disc player, and more particularly, it relates to a mechanism suitable for loading a record into the player and retrieving it therefrom without the necessity for the operator to touch the record.

In certain video disc systems, information is stored on a disc record in the form of geometric variations in the bottom of a continuous spiral groove disposed on the record surface. The variations in capacitance between an electrode incorporated in a groove-riding stylus and a conductive property of the record are sensed to reproduce the stored information. A capacitance-type video disc system is illustratively disclosed in U.S. Pat. No. 3,842,194 (Clemens).

In such systems, it is advantageous to mount a groove-riding pickup stylus in a demountable cartridge. The cartridge is, in turn, mounted in a translatable arm carriage, which is radially driven during playback in correlation with the motion of the groove-riding stylus. U.S. Pat. No. 3,870,320 (Torrington), discloses a type of carriage translating system.

It is beneficial to enclose a record in a thin plastic caddy which comprises a jacket and a record retaining spine removably located therein. The spine additionally serves as a closure device for the jacket when it is fully seated therein. For record loading, a full caddy is inserted into an input slot provided in the player. A record extracting mechanism disposed in the player removes the record from the caddy during subsequent jacket withdrawal, whereby the record is retained in the player. The player is equipped with a platform for supporting the retained record. The retained record is subsequently transferred to the turntable for playback. For subsequent record retrieval, the record is raised relative to the turntable, and an empty jacket is inserted into the player, thereby returning the record back into the caddy. Withdrawal of the caddy, effects record removal from the player. Reference may be made to the U.S. Pat. Nos. issued to Leedom (4,098,511), Coleman (4,124,866) and Torrington (4,133,540) for examples of prior art record extracting mechanisms suitable for use in a video disc type player.

In the above-mentioned type systems, it is desirable to prevent an enclosed record from accidentally falling out of its protective caddy, and to deter indiscriminate access to the enclosed record. To this end, the record retaining spine is provided with a pair of integrally-molded flexural locking fingers carrying protruding elements which are seated in pockets disposed in the jacket when the spine is fully received therein, whereby the spine is locked in place. When a full caddy is inserted into the player for loading the enclosed record therein, the flexural locking members are deflected to allow separation of the spine from the jacket. Reference may be made to the U.S. Pat. No. 4,164,782, filed in the name of Stewart for an illustration of a caddy locking mechanism.

A record extracting mechanism suitable for use with the above-mentioned type systems is described in a copending commonly-assigned, concurrently-filed U.S. patent application filed in behalf of C. F. Coleman and entitled "RECORD EXTRACTING MECHANISM FOR CADDY TYPE VIDEO DISC PLAYER", Ser. No. 081494, filed Oct. 1, 1979 now U.S. Pat. No. 4,239,239. In the therein disclosed system, a movably-mounted latch defeat member is disposed in the player along the caddy insertion path when occupying the starting position thereof such that it engages the spine latch member during a caddy arrival at a fully inserted position in the player so that the spine latch member is deflected in a manner freeing the spine from the jacket. A spine gripper member, subject to engagement with the spine during an occupied caddy arrival at the fully inserted position, is also movably mounted in the player for securing the spine to the player, whereby the spine, freed from the jacket and secured to the player, is removed from the jacket and retained in the player along with an associated record during subsequent jacket withdrawal. The latch defeat member is displaced away from the starting position to a deflected position during the aforesaid jacket withdrawal, thereby freeing the spine latch member from interference by the latch defeat member. An empty jacket is inserted into the player for retrieving the retained record. The spine latch member, having been freed from interference by the latch defeat member, serves to secure the spine to the jacket upon arrival of the jacket at the fully inserted position. The location of the latch defeat member occupying the deflected position is such that the empty jacket engages the deflected latch defeat member to cause further displacement thereof during arrival of the empty jacket at the fully inserted position for effecting motion of the spine gripper member away from the spine in a manner releasing the spine from the player, whereby the spine secured to the jacket effects removal of the accompanying record from the player during subsequent caddy withdrawal.

In the particular embodiment described in the aforesaid Coleman application, the spine latch member serves, in addition to selectively locking the spine to the jacket, to deflect the latch defeat member from the starting position to the deflected position thereof upon jacket withdrawal, whereby when an empty jacket is subsequently inserted into the player for record retrieval it engages the deflected latch defeat member to cause further deflection thereof during the jacket insertion. As previously indicated, such further deflection of the latch defeat member is utilized to effect motion of the spine gripper member away from the spine in a manner freeing the spine from the player, thereby allowing record retrieval during subsequent caddy withdrawal.

The instant application is directed to a modification of a Coleman-type record extracting mechanism. In accordance with the subject invention, displacement of the latch defeat member from the starting position to the deflected position during jacket withdrawal is advantageously effected independent of the action of the spine latch member.

Figure 1:
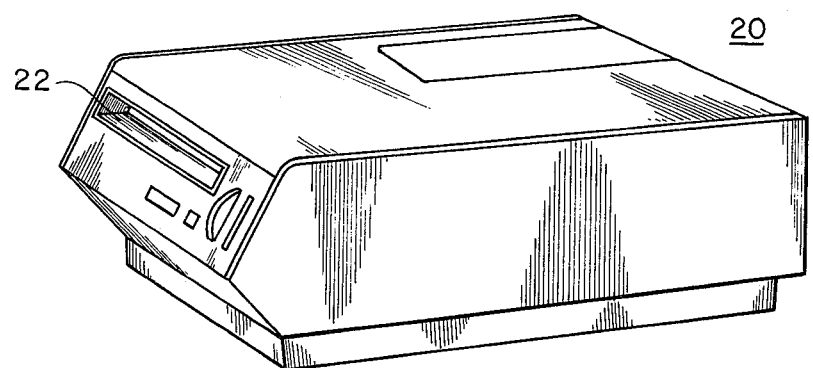
FIG. 1 shows a video disc player suitable for use with a record caddy and incorporating a record extracting mechanism in accordance with this invention.
Figure 4:
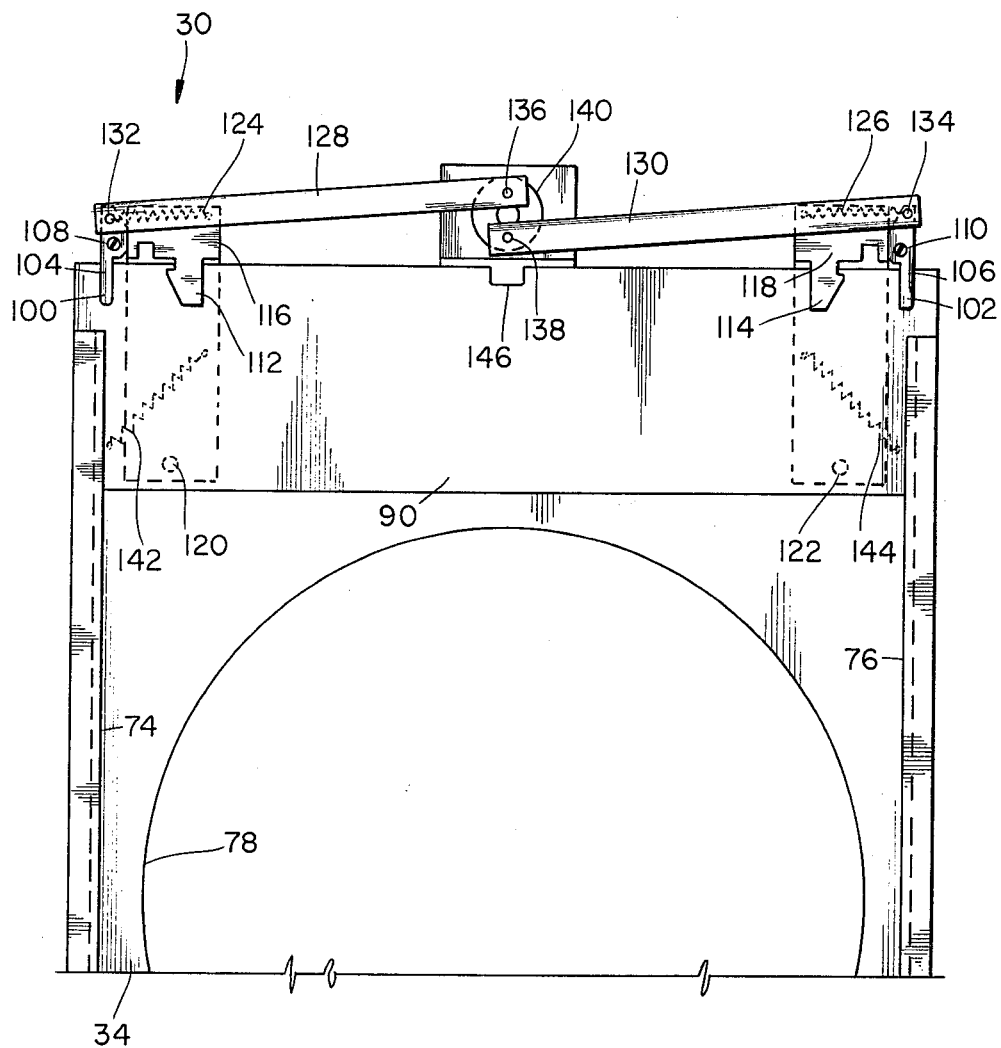

FIG. 4 diagrammatically illustrates the record extracting mechanism of FIG. 1.

As shown in FIG. 1, a video disc player 20 has an input slot 22 disposed at the front end thereof. To load a record into the player, a record caddy 24, as shown in FIG. 3, comprising a sleeve 26 and a record retaining spine 28, is inserted into the player through the input slot 22. A record extracting mechanism 30, illustrated in FIGS. 2 and 4, removes the spine 28 and the associated record 32 from the sleeve 26 and retains them in the player resting on a platform 34 disposed therein when the sleeve is withdrawn from the player, in the manner to be described hereinafter in accordance with this invention.

Figure 2:
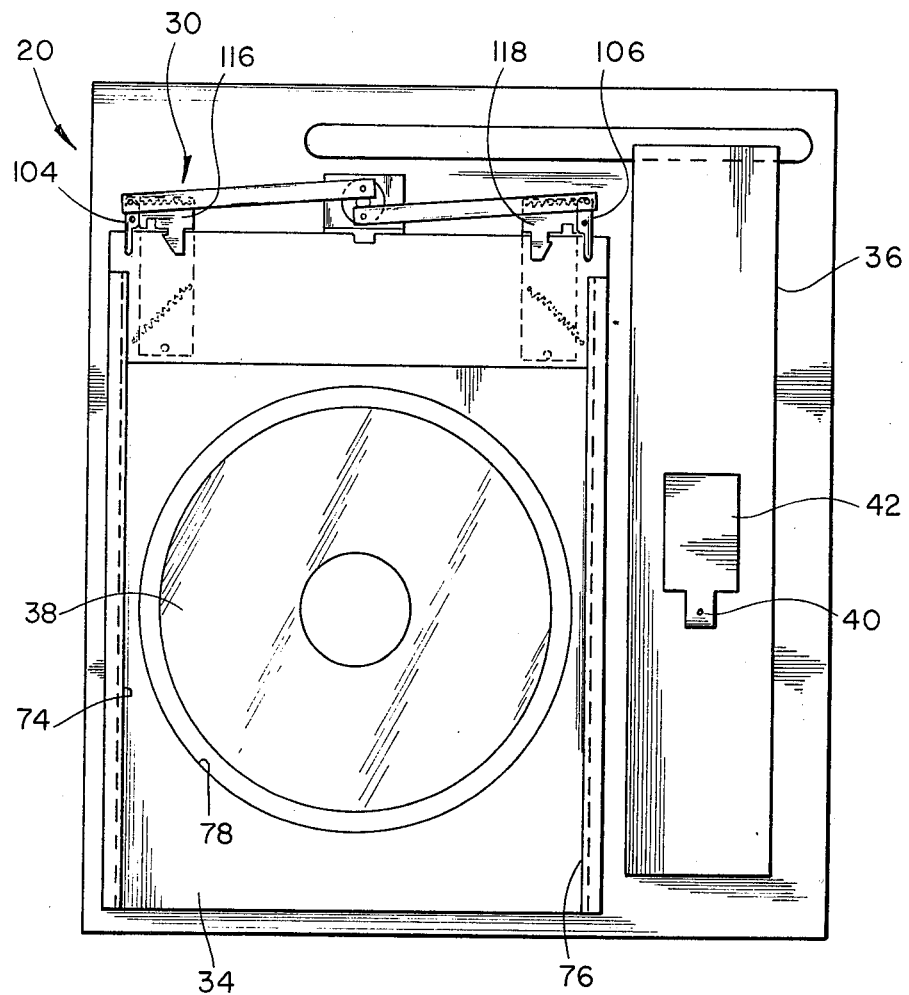
FIG. 2 is a schematic representation of the player of FIG. 1.
Figure 3:
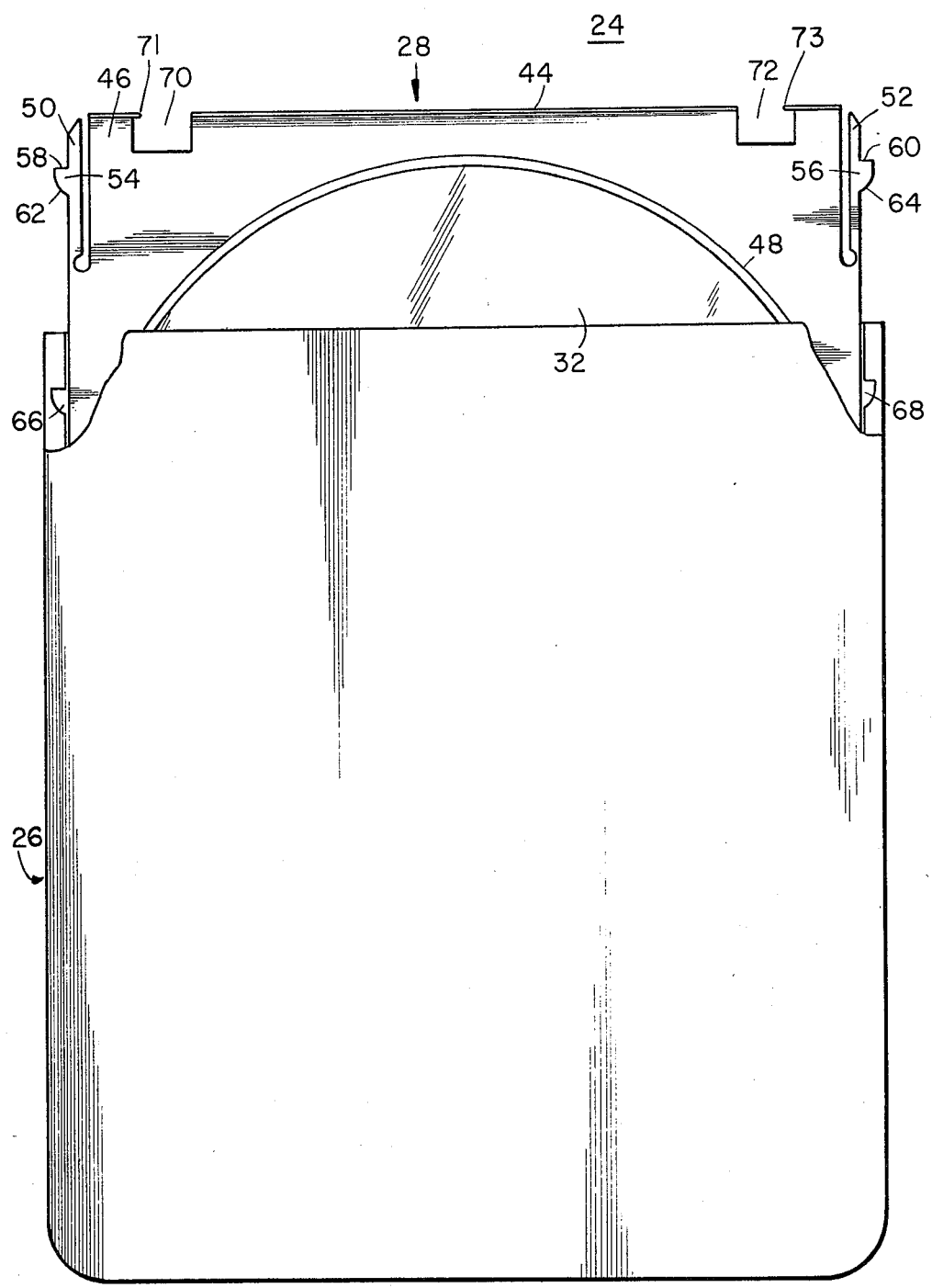
FIG. 3 depicts a caddy suitable for use with the player of FIG. 1.

As shown in FIG. 2, the player includes a carriage 36 which is translated toward the center of a turntable 38, rotatably mounted in the player, in synchronism with the motion of a pickup stylus 40 during playback. The pickup stylus 40 is mounted in a removable cartridge 42 which is installed in a compartment provided in the carriage 36.

As shown in FIG. 3, the record retaining spine 28 has a portion 44 which serves as a closure when the spine is fully inserted into the sleeve, and a portion 46 having a circular opening 48 for receiving the record 32. The spine 28 is further provided with a pair of integrally-molded, flexural latch members 50 and 52, which have free ends adapted for deflection, for example, parallel to the major surface of the spine. Each of the spine latch members 50 and 52 has a protruding element 54 and 56. Each of the protruding elements 54 and 56 has a square edge 58 and 60, and an inclined edge 62 and 64. The protruding elements 54 and 56 are received in pockets 66 and 68 disposed in the sleeve 26 for locking the spine 28 in place when it is fully inserted therein. A pair of cutouts 70 and 72 are disposed in the closure portion 44 of the spine for reasons to be described hereinafter.

The record extracting apparatus 28 of this invention will now be described in detail in conjunction with FIG. 4. The record support platform 34 is equipped with a pair of rails 74 and 76 for guiding the caddy 24 during its insertion into the player through the input slot 22. As the caddy 24 arrives at a fully inserted position in the player the wedge-like portions 100 and 102 of a pair of latch defeat members 104 and 106, pivotally mounted on the platform 34 about pins 108 and 110 respectively, enter the sleeve 26 to deflect the spine latch members 50 and 52, whereby the spine 28 and the enclosed record 32 are freed from the sleeve.

As the caddy 24 arrives at the fully inserted position in the player, the jaw-like portions 112 and 114 disposed on a pair of spine gripper members 116 and 118, pivotally mounted on the platform 34 about pins 120 and 122 respectively, enter the cutouts 70 and 72 disposed in the closure portion 44 and are urged to engage the projections 71 and 73 to lock the spine 28 to the player. Since the spine 28 is released from the sleeve 26 and secured to the player, subsequent withdrawal of the sleeve leaves the spine and the record 32 in the player resting on the support platform 34.

The engagement between the jaws 112 and 114 and the walls of the cutouts 70 and 72 disposed in the spine 28 during arrival of the sleeve 26 at the fully inserted position in the player effects deflection of the spine gripper members 116 and 118 toward each other. Such deflection of the spine gripper members 116 and 118, in turn, causes rotation of the latch defeat members 104 and 106 about their respective pins 108 and 110 due to the springs 124 and 126 disposed between the latch defeat members and the spine gripper members such that the wedge-like portions 100 and 102 are deflected away from each other.

To synchronize the opposite motion of the latch defeat members 104 and 106, a pair of levers 128 and 130 are arranged between pins 132 and 134 secured to the latch defeat members and pins 136 and 138 mounted on a member 140 rotatably disposed on the platform 34 centrally between the latch defeat members as can be seen from FIG. 4. The pins 136 and 138 are disposed diametrically opposite to each other and equidistant from the axis of rotation of the rotatably-mounted member 140.

The record 32 resting on the support platform 34 is transferred to the turntable 38 for playback by suitable means. For example, the uniform 34 may be depressed relative to the turntable 38 in the manner described in the Stewart patent (U.S. Pat. No. 4,164,782) to deposit the record 32 on the turntable. Alternatively, the turntable 38 may be raised relative to the platform 34 to transfer the record 32 from the platform to the turntable. The platform 34 has an opening 78 having a diameter larger than the diameter of the turntable 38, but smaller than the record diameter. The record 32 is returned back to the platform 34 after playback.

To retrieve the record 32, the empty sleeve 26 is reinserted into the player. The locations of the deflected latch defeat members 104 and 106 are such that the empty sleeve 26 engages the latch defeat members to cause further displacement thereof during arrival of the empty jacket at the fully inserted position. Such further displacement of the latch defeat members, in turn, causes the jaws 112 and 114 disposed on the spine gripper members 116 and 118 to move closer to each other in a manner disengaging the spine 28 from the player.

When the sleeve 26 reaches the fully inserted position in the player, the protruding elements 54 and 56 disposed on the spine latch members 50 and 52 snap back into pockets 66 and 68 provided in the sleeve 26 to latch the spine 28 to the sleeve. Since the spine 28 is locked to the sleeve 26 and freed from the player, subsequent withdrawal of the sleeve removes the record and the spine from the player.

When the caddy 24 is withdrawn from the player, a pair of springs 142 and 144 serve to return the latch defeat members 104 and 106 and the spine gripper members 116 and 118 to their respective starting posititons in preparation for the next cycle of operations. A hold down member 146 is disposed on the platform 34 to guide the leading edge of the caddy as it arrives at the fully inserted position in the player.

What is claimed is:

1. A player for recovering prerecorded signals from a disc record removably subject to occupancy of a protective cover comprising a jacket and a record retaining spine removably located therein; said spine being provided with a latch member for releasably securing said spine to said jacket; said player comprising:
   (A) a housing having an input slot into which an occupied cover is inserted along a path for loading a record therein;
   (B) a turntable rotatably mounted in said housing;
   (C) a guide disposed in said housing;
   (D) a latch defeat member movably-mounted in said housing and subject to deflection away from a starting position; said latch defeat member being located along said cover insertion path when occupying said starting position thereof such that it is wedged between said spine latch member and an interior portion of said jacket during an occupied cover arrival at a fully inserted position in said player so that said spine latch member is deflected in a manner freeing said spine from said jacket;

(E) a spine gripper member movably-mounted in said housing and subject to deflection away from a beginning position; said spine gripper member being subject to engagement with said spine during an occupied cover arrival at said fully inserted position for releasably securing said spine to said housing, whereby said spine, being freed from said jacket and secured to said housing, is removed from said jacket and retained in said player resting on said guide along with an associated record during a jacket withdrawal subsequent to an occupied cover arrival at said fully inserted position; wherein said engagement of said spine gripper member with said spine effects a displacement of said spine gripper member away from said beginning position thereof;

(F) means responsive to said displacement of said spine gripper member for deflecting said latch defeat member away from said starting position thereof to a deflected position when said latch defeat member is released from the engagement with said interior portion of said jacket during said jacket withdrawal, whereby said spine latch member is freed from interference by said latch defeat member;

(G) means for transferring said retained record from said guide to said turntable for playback; said transferring means also serving to transfer said retained record from said turntable to said guide for record retrieval;

wherein an empty jacket is inserted into said input slot along said path for retrieving said retained record resting on said guide; wherein said spine latch member, having been freed from interference by said latch defeat member, serves to latch said spine to said jacket upon arrival of said jacket at said fully inserted position; wherein the location of said deflected latch defeat member is such that said empty jacket engages said latch defeat member to cause further deflection thereof during arrival of said empty jacket at said fully inserted position; and (H) means responsive to said further deflection of said latch defeat member for effecting motion of said spine gripper member in a manner disengaging said spine from said housing so that said spine latched to said jacket effects record retrieval during subsequent cover withdrawal.

2. The player as defined in claim 1 including a pair of latch defeat members and a pair of spine gripper members; said player further including means for synchronizing the motion of said latch defeat members.

3. The player as defined in claim 2 wherein each of said latch defeat members is pivotally mounted in said housing about an axis disposed substantially parallel to the axis of said turntable; wherein each of said spine gripper members is pivotally mounted in said housing about an axis disposed parallel to said axes of said latch defeat members.

4. The player as defined in claim 3 wherein means are provided for biasing said spine gripper members in a direction urging engagement thereof with said spine during cover arrival at said fully inserted position.

5. The player as defined in claim 4 wherein said means responsive to said displacement of said spine gripper members for deflecting said latch defeat members comprises springs disposed between said spine gripper members and said latch defeat members.

6. The player as defined in claim 3 wherein said synchronizing means comprises a pair of levers and a member rotatably mounted in said housing centrally between said latch defeat members about an axis disposed parallel to said axes of said latch defeat members; a first one of said pair of levers being disposed between a pin disposed on one of said latch defeat members and a pin disposed on said rotatably-mounted member; the other of said pair of levers being disposed between a pin disposed on the other of said latch defeat members and a pin disposed on said rotatably-mounted member; said pins on said rotatably-mounted member being disposed diametrically opposite to each other and equidistant from said axis of rotation of said rotatably-mounted member.

7. The player as defined in claim 2 for use with a cover having a spine provided with a pair of cutouts; wherein each of said spine gripper members terminates into a jaw portion at the free end thereof; the location of said cutouts being such that each one of said cutouts receives the respective one of said jaw portions during cover arrival at said fully inserted position for latching said spine to said housing.

* * * * *